US008662562B2

(12) United States Patent
Ackermann

(10) Patent No.: US 8,662,562 B2
(45) Date of Patent: Mar. 4, 2014

(54) OVERLOAD PROTECTIVE DEVICE FOR A DOOR

(76) Inventor: Klaus Ackermann, Munich (DE)

( * ) Notice: Subject to any disclaimer, the term of this patent is extended or adjusted under 35 U.S.C. 154(b) by 0 days.

(21) Appl. No.: 13/173,340

(22) Filed: Jun. 30, 2011

(65) Prior Publication Data

US 2012/0005962 A1 Jan. 12, 2012

(30) Foreign Application Priority Data

Jul. 6, 2010 (DE) ........................ 10 2010 026 190

(51) Int. Cl.
*B60J 5/00* (2006.01)

(52) U.S. Cl.
USPC .................................................... 296/146.11

(58) Field of Classification Search
USPC ........................... 16/82, 83; 296/146.11, 202
See application file for complete search history.

(56) References Cited

U.S. PATENT DOCUMENTS

| | | | | |
|---|---|---|---|---|
| 4,772,054 | A * | 9/1988 | Schreiber et al. | 292/275 |
| 5,074,611 | A * | 12/1991 | Newkirk | 296/146.6 |
| 6,237,190 | B1 * | 5/2001 | Grumm et al. | 16/82 |
| 6,349,448 | B1 * | 2/2002 | Breed et al. | 16/82 |
| 6,438,794 | B2 * | 8/2002 | Ng et al. | 16/82 |
| 2010/0154163 | A1 * | 6/2010 | Hoffmann | 16/85 |
| 2010/0199460 | A1 * | 8/2010 | Perche | 16/82 |

FOREIGN PATENT DOCUMENTS

DE 857766 7/1949

* cited by examiner

*Primary Examiner* — Dennis Pedder
(74) *Attorney, Agent, or Firm* — Andrew M. Calderon; Roberts, Mlotkowski, Safran & Cole, P.C.

(57) ABSTRACT

A door overload protection device for a vehicle door, especially for an armored vehicle door is disclosed. The door overload protection includes a door leaf, a door frame and at least one hinge, the device being made such that it can act against a compressive force which has arisen from the weight of the door leaf and which is applied in a vertical and/or a horizontal direction in its moving, opening and closing state. A method for producing a door overload protection device is also provided.

20 Claims, 1 Drawing Sheet

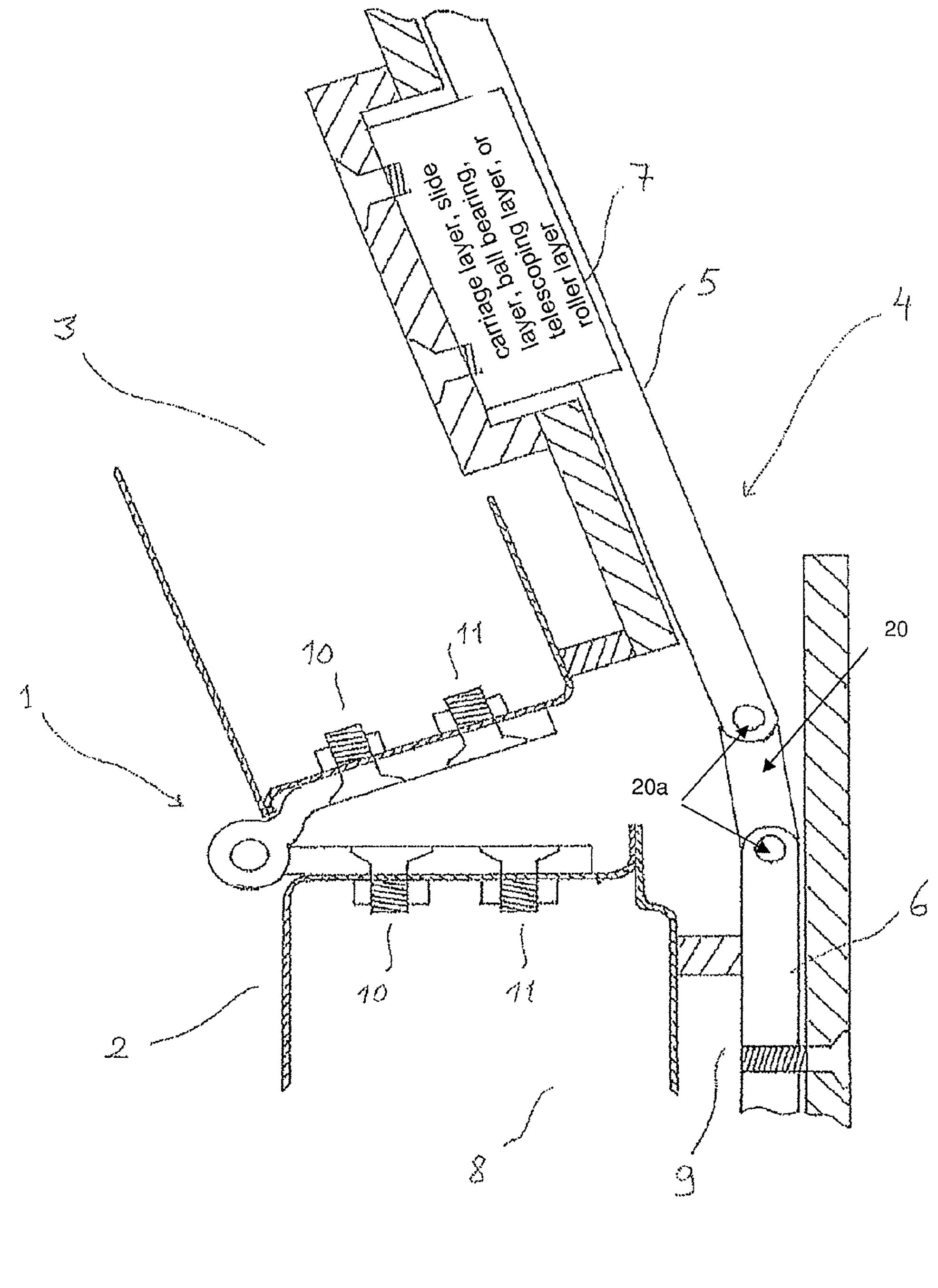
carriage layer, slide layer, ball bearing, or telescoping layer, or roller layer
7
5
4
3
1
10
11
10
11
2
8
9
6
20
20a

OVERLOAD PROTECTIVE DEVICE FOR A DOOR

FIELD OF THE INVENTION

This invention relates to a door overload protection device for a vehicle door, especially for an armored vehicle door which comprises a door leaf, a door frame and at least one hinge.

DISCUSSION OF BACKGROUND INFORMATION

Under normal conditions, the weight of a vehicle door is borne by its hinges formed for this purpose. A vehicle door or a door for other purposes can be built heavier than an average heavy door for various reasons. With an increase in the weight of the door or vehicle door its hinges are directly loaded. This hinge loading limit can be quickly exceeded, especially if it is an armored door. Since an armored door must meet certain requirements for stability and safety, a special construction is necessary to be able to protect for example the passengers of a vehicle in critical cases. For this purpose the conventional hinges are not able to bear an armored door.

DE 198 35 698 discloses a vehicle door with a door leaf which is reinforced, raising the weight, which is coupled to be able to pivot open on a vehicle structure via a door hinge, and in which between the door leaf edge region which is away from the hinge axis and the vehicle structure there is a pivot safeguard which limits the door opening angle by a stop, including a reset blocking device which can be isolated to close the door and which automatically locks the door in the open position. The disadvantage here is that this type of structure of a vehicle door does not satisfy the requirements of an especially armored vehicle door and that the required safety of the passengers cannot be guaranteed in this way because a heavy door cannot be held solely with these hinges, especially if a door must be built for certain purposes and must be armored heavily enough.

SUMMARY OF INVENTION

Therefore the object of the invention is to devise a way in which an armored vehicle door can be made easily and with relatively low cost on a vehicle of the initially named type to ensure maximum possible protection of passengers.

This object is achieved as claimed in the invention by the features of the claimed invention.

Other advantageous configurations are given by the features of the dependent claims.

The invention is based on the idea that a door overload protection device for a vehicle door, especially for an armored vehicle door, which comprises a door leaf, a door frame and at least one hinge, the device being made such that it can act against a compressive force which has arisen from the weight of the door leaf and which is applied in a vertical and/or a horizontal direction in its moving, opening and closing state. In this way maximum safety is ensured in critical cases, for example an attack launched from the outside, for vehicle passengers, in which the vehicle door can be accordingly heavily armored. The device acts against a compressive force which is caused by the heavy armoring in the vertical and horizontal direction in which the forces are equalized especially in these directions. A compressive force is equalized in each state of the door in a closing, moving and opening state. This prevents the vehicle door from dropping under its heavy weight. Consequently the service life of the door is prolonged. The door overload protective device as claimed in the invention stably and securely holds the armored door in any state of motion as a result of the increase in the armor weight compatibility and bending stress capacity of the vehicle door.

According to one advantageous configuration of the invention the load holding capacity of the door overload protection device is proportional to a door weight, especially to an armored door weight. In this way a vehicle door, depending on the respective need, can be armored so heavily that it remains resistant under any level of attack and is not adversely affected by it so that maximum safety for the passengers is ensured.

According to another advantageous configuration of the invention the door overload protection device as claimed in the invention comprises at least one rail which has at least one connecting element and at least one carriage layer, the rail with its one end being connectable by means of its connecting element to a pillar section on the frame and with its carriage layer to one section in the inside of the door leaf, and the door leaf-side end of the rail being made to be able to move freely so that the rail can be extended or kept extended parallel to the direction of travel in the closed state, transversely to the direction of travel in the open state of the door. In this way a vehicle door can be heavily armored since the weight of the door leaf added by heavy armoring can be better borne and the bending stress capacity of the door leaf can be increased. As claimed in the invention the door overload protection device has a carriage layer which is attached to the inside of the door leaf for the rail, as a result of which the force of the door leaf is transferred to the rail. The stable construction of the device increases the load holding capacity of the door and becomes especially more resistant in danger situations.

According to still another advantageous configuration of the invention the door overload protection device is made in one piece. In this way, at the same time economical production and a safety-enhancing construction are achieved so that the door overload protection device in case of an attack can continue and hold together better against the action of a compressive force.

According to one advantageous configuration of the invention at least one pillar of the vehicle is made compatible with a compressive force such that a connecting element which is made likewise compatible with a compressive force is attached and held on the pillar. The vehicle pillars are made reinforced and armored such that they can hold a heavily armored door. Since only one pillar made accordingly stable and strong can hold the door overload protection device as claimed in the invention which bears a heavy weight of the armored door leaf. Advantageously the door overload protection device as claimed in the invention can be connected adhesively and/or positively and/or nonpositively to one section of the pillar by its connecting element and to one section on the inside of the door leaf by the attachment of its carriage layer. In this way a stable connection between the two parts, between the door frame and the door leaf, is achieved.

According to another advantageous configuration of the invention the connecting element on the frame is made of a hinge unit which can be attached to one pillar section, its being made suitable for a strong loading and bending stress in a complete opening of the door. The hinge unit is located completely on the pillar section, its being made pivotable around its axle when the door moves. As claimed in the invention this hinge unit is built to be stable such that it satisfies the requirements for bearing and holding a heavily armored door. The device as claimed in the invention enables door opening up to 100° without loss of stability of the door.

According to one advantageous configuration of the invention the door overload protection device is made of a material which corresponds to the door weight, for example of metal and/or metal alloys and/or plastic. This increases a load holding capacity and compressive force compatibility when an armored door is held in its moving, opening and holding state and a door structure tailored to need and situation is enabled.

According to another advantageous configuration of the invention the door overload protection device as claimed in the invention can be automatically actuated when the door is opening, the actuation taking place manually and/or pneumatically and/or electrically and/or hydraulically. In this way the door can be easily used. Advantageously it can be made in a form which can be screened and/or unscreened in an open and also a closed state of the door. In this way, on the one hand space is saved, on the other hand the device as claimed in the invention is prevented from being visible from the outside.

According to another advantageous configuration of the invention the at least one hinge which is pivotally attached to the door frame and which is present in addition between the door leaf and the door frame interacts with the device for opening and closing the door. In this way the vehicle door can be properly opened and closed. Advantageously the door overload protection device is moved at the same time with the additionally existing conventional hinge.

According to still another advantageous configuration of the invention the door overload protection device can be additionally used for a sliding door. This yields more possible uses of the device as required.

Another subject matter of the invention is a method for producing a door overload protection device for a vehicle door, especially for an armored vehicle door, which comprises a door leaf, a door frame and at least one hinge, the door overload protection device being made such that in its moving, opening and closing state it can act against a compressive force which has originated from the weight of the door leaf and which is applied in a vertical and/or horizontal direction.

According to one advantageous configuration of the invention, the door overload protection device comprises at least one rail which has at least one connecting element and at least one carriage layer, the rail with one of its ends being connected by means of its connecting element to a pillar section on the frame and with its carriage layer to one section in the inside of the door leaf, the door leaf-side end of the rail being made to be able to move freely so that the rail can be extended and kept extended parallel to the direction of travel in the closed state and transversely to the direction of travel in the open state of the door. It is also possible at the location of the slide layer to use a ball bearing, a telescoping layer, a roller layer or a slide layer. In this way all advantages of the door overload protection device as claimed in the invention which have also been explained above can be implemented.

It should be mentioned especially that with this door overload protection device as claimed in the invention there are diverse possible applications wherever the conventional hinges no longer satisfy requirements to hold the weight of a door. The device can be widely used mainly in financial and security installations.

BRIEF DESCRIPTION OF THE DRAWINGS

The invention is detailed below using one exemplary embodiment shown in the drawings. The sole FIGURE shows the door overload protection device as claimed in the invention in an open state of the vehicle door.

DETAILED DESCRIPTION OF THE PRESENT INVENTION

The FIGURE shows a door 1 of the vehicle which is not shown here and which comprises one door frame 2 on the body side and one door leaf 3. The door leaf 3 is shown here only from its inside. The device 15 as claimed in the invention which connects the door leaf 3 to the door frame 2 comprises a rail 5. This rail 5 in its door frame-side origin is equipped with a connecting element 6 which is made as an accordingly stable hinge unit. A bar 20 with two linkage points **20*a* pivotably connects the rail 5 to a connecting element 6 to allow the door leaf to move between an open position and a closed position. The rail 5 is connected by its connecting element 6 or hinge unit on an upper pillar section 9 to the pillar 8 of the door frame 2. The pillar 8 of the vehicle to which the device 4 as claimed in the invention is connected is made with armor steel which can withstand a compressive force so that a load holding capacity is ensured. The device 4 is attached with its connecting element 6 or its hinge unit to the pillar section 9 by a screw union. Another connection for attaching the device 4 to the pillar section 9 is likewise possible, for example by weld and/or rivet joint. Thus the rail 5 of the device 4 as claimed in the invention is pivotally connected by its connecting element 6 to one pillar section 9 to the pillar 8. The door leaf-side end of the rail 5 is not made attached, but able to move freely, so that the door 1 becomes extensible and can be kept extensible. The rail 5 is equipped with a carriage layer 7 with which it can be secured on the door leaf 3. The carriage layer 7 is made in this way, in which the rail 5 can move sliding with the movement of the door 1. The rail 5 is connected at one site on the inside of the door leaf 3 to the door leaf 3 by the carriage layer 7. So that the device 4 as claimed in the invention in a closed construction is attached able to be screened to one section on the inside of a door leaf 3 which is especially heavily armored by a screw union. As is the case in the connecting element 6 on the pillar 8, the carriage layer 7 can also be attached to the inside of the door leaf 3 by weld and/or rivet joint. As mentioned above, for example a ball bearing, a telescoping layer, a roller layer or a slide layer can be used in place of a carriage layer each depicted as reference numeral 7. It is especially important that in each step of the execution of the device 4** as claimed in the invention the choice of the material is decisive. Since its load holding capacity must be proportional to a door weight or a heavily armored door weight.

The door overload protection device 4 as claimed in the invention which is shown in the FIGURE is automatically actuated with movement of the vehicle door 1, the connecting element 6 or hinge unit pivoting on the pillar 10 around its axle so that the rail 5 in an open state of the door 1 can be extended and can be kept extended parallel to the direction of travel in the closed state, transversely to the direction of travel in the open state of the door 1 in order to equalize the vertical and horizontal forces acting on the connecting element 6. Conventionally the vehicle has its conventional hinges 10, 11 which are pivotally attached between the door leaf 3 and the door frame 2 to the door casing and which interact with the device 4 for opening and closing the door 1. The movement of the device 4 and the conventionally present hinges 10, 11 takes place at the same time. In addition to the manual actuation possibility, the door overload protection device 4 as claimed in the invention can also be actuated electrically, pneumatically and hydraulically.

As mentioned above, this device 4 can also be used for a sliding door.

The door overload protection device 4 as claimed in the invention can be diversely used in many different areas, where especially security requirements are necessary, for example in the financial sector, privately at home, etc.

The invention claimed is:

1. A door overload protection device for a vehicle door, which comprises a door leaf, a door frame and at least one hinge, wherein the door overload protection device acts against a compressive force which has arisen by a blast wave and from a weight of the door leaf, and which is applied in at least one of a vertical and a horizontal direction in its moving, opening and closing state, wherein the door overload protection device comprises:

an assembly secured to the door leaf;

at least one rail which is slidingly attached to the assembly;

a connecting element which is connected to a pillar section on the door frame; and a bar with two linkage points structured to pivotably connect the at least one rail to the connecting element and allow the door leaf to move between an open position and a closed position.

2. The door overload protective device as claimed in claim 1, wherein the door overload protection device load holding capacity is proportional to a door weight.

3. The door overload protective device as claimed in claim 1, wherein the assembly is a carriage layer, and the rail with its one end is connectable by the connecting element to the pillar section on the door frame and with its carriage layer to one section in an inside of the door leaf, and a door leaf-side end of the rail being structured to move freely so that the rail can be extended or kept extended parallel to a direction of travel in the closed state, transversely to a direction of travel in the open state of the door.

4. The door overload protective device as claimed in claim 3, wherein a compressive force of the door leaf can be transferred to the rail by the carriage layer.

5. The door overload protective device as claimed in claim 1, wherein at least one pillar is made compatible with the compressive force such that the connecting element which is made likewise compatible with the compressive force is attached and held on the pillar.

6. The door overload protective device as claimed in claim 3, wherein the door overload protection device is connected to a section of the pillar section by the connecting element and to at least one section in the inside of the door leaf by attachment of the carriage layer.

7. The door overload protective device as claimed in claim 6, wherein the connecting element on the door frame includes a hinge unit which can be attached to the section of the pillar section, and being made for a loading and bending stress in a complete opening of the door.

8. The door overload protective device as claimed in claim 7, wherein the hinge unit is located on the section of the pillar, and being made pivotable around its axle when the door moves.

9. The door overload protective device as claimed in claim 1, wherein the door overload protection device is made of a material which corresponds to the door weight.

10. The door overload protective device as claimed in claim 1, wherein the door overload protection device can be automatically actuated when the door is opening.

11. The door overload protective device as claimed in claim 1, wherein the door overload protection device is made in a form which can be at least one of screened and unscreened both in an open and also a closed state of the door.

12. The door overload protective device as claimed in claim 1, wherein for opening and closing the door, at least one hinge which is pivotally attached to the door frame and which is present between the door leaf and the door frame interacts with the door overload protection device, the movement of the door overload protection device and the at least one hinge taking place at a same time.

13. The door overload protective device as claimed in claim 1, wherein the door overload protection device is structured for use with a sliding door.

14. The door overload protective device as claimed in claim 9, wherein the door overload protection device is made of at least one of metal and metal alloys and plastic.

15. A door overload protection device, comprising:

at least one rail which has a connecting element and at least one carriage layer, the connecting element being fixedly connected to a pillar section on a frame and the layer connected to an inside of the door leaf, the door leaf-side end of the rail structured to move freely so that the rail can be extended and kept extended parallel to a direction of travel in a closed state and transversely to a direction of travel in an open state of the door.

16. The door overload protective device as claimed in claim 15, wherein the carriage layer is one of a slide layer, a ball bearing, a telescoping layer, and a roller layer.

17. The door overload protective device as claimed in claim 15, further comprising a bar that is pivotally connected to an end of the at least one rail and an end of the at least connecting element.

18. The door overload protective device as claimed in claim 17, wherein another end of the at least connecting element is secured to the pillar section by a screw.

19. The door overload protective device as claimed in claim 1, wherein the connecting element is secured to an inside of the door frame.

20. The door overload protective device as claimed in claim 15, wherein the connecting element is secured to an inside of the door frame.

* * * * *